(12) United States Patent
Larsson et al.

(10) Patent No.: US 11,225,205 B2
(45) Date of Patent: Jan. 18, 2022

(54) HAUL TRUCK BODY AND A METHOD FOR MANUFACTURING A HAUL TRUCK BODY

(71) Applicant: Metso Sweden AB, Trelleborg (SE)

(72) Inventors: Fredrik Larsson, Malmö (SE); Henrik Persson, Trelleborg (SE)

(73) Assignee: Metso Sweden AB, Trelleborg (SE)

( * ) Notice: Subject to any disclaimer, the term of this patent is extended or adjusted under 35 U.S.C. 154(b) by 184 days.

(21) Appl. No.: 16/623,220

(22) PCT Filed: Jun. 21, 2018

(86) PCT No.: PCT/EP2018/066682
§ 371 (c)(1),
(2) Date: Dec. 16, 2019

(87) PCT Pub. No.: WO2018/234514
PCT Pub. Date: Dec. 27, 2018

(65) Prior Publication Data
US 2021/0146855 A1    May 20, 2021

(30) Foreign Application Priority Data

Jun. 22, 2017  (EP) .................................... 17177442

(51) Int. Cl.
*B60P 1/28* (2006.01)
*B60R 13/01* (2006.01)

(52) U.S. Cl.
CPC .............. *B60R 13/01* (2013.01); *B60P 1/286* (2013.01); *B60R 2013/016* (2013.01)

(58) Field of Classification Search
CPC . B60R 13/01; B60R 2013/016; B60R 13/011; B60R 2013/015; B60R 2013/018; B60P 1/286; B60P 1/28; B60P 1/283

USPC ....... 296/39.1, 39.2; 298/7, 17 R, 22 R, 22 P
See application file for complete search history.

(56) References Cited

U.S. PATENT DOCUMENTS

| 3,897,972 | A |   | 8/1975 | Logue |
|---|---|---|---|---|
| 4,592,583 | A |   | 6/1986 | Dresen et al. |
| 4,644,631 | A | * | 2/1987 | Shock ..................... B60P 1/286 |
| 4,826,233 | A |   | 5/1989 | Hagenbuch |

(Continued)

FOREIGN PATENT DOCUMENTS

| CL | 2003000873 | 12/2004 |
|---|---|---|
| CL | 2007001760 | 3/2008 |

(Continued)

OTHER PUBLICATIONS

Examination Report No. 1 for Australian Patent Application No. 2018287167, dated Sep. 11, 2020.

(Continued)

*Primary Examiner* — Stephen T Gordon
(74) *Attorney, Agent, or Firm* — Andrus Intellectual Property Law, LLP

(57) ABSTRACT

The invention relates to a haul truck body, comprising a front wall and two opposing side walls. Each side wall presenting an inner surface and an upper edge portion extending rearwardly from a rear end of side wall towards the front wall. Also, each side wall presents an upper reinforcement element which is integrally formed with the side wall and extends along the upper edge portion of the side wall. The invention also relates to a truck and a method for manufacturing a haul truck body.

11 Claims, 3 Drawing Sheets

(56) References Cited

U.S. PATENT DOCUMENTS

| | | | |
|---|---|---|---|
| 5,007,671 | A | 4/1991 | Oprea |
| 5,597,193 | A | 1/1997 | Conner |
| 5,806,909 | A | 9/1998 | Wise |
| 9,308,875 | B2 | 4/2016 | Burstrom et al. |
| 2013/0069417 | A1 | 3/2013 | Wink |
| 2015/0061311 | A1 | 3/2015 | Natarajan et al. |
| 2017/0174148 | A1* | 6/2017 | Fujan .................. B60P 1/286 |

FOREIGN PATENT DOCUMENTS

| | | |
|---|---|---|
| CL | 2012000458 | 10/2012 |
| CL | 2012002714 | 8/2013 |
| CL | 2014001670 | 12/2014 |
| CN | 103395385 A | 11/2013 |

OTHER PUBLICATIONS

Notification of Opposition for Chilean Patent Application No. 2019003688, dated Oct. 8, 2020.

"PLATENSA (Plasticos Tecnicos Nij5 S.A.)", retrieved from https://web.archive.org/web/20170505174258/http://platensa.com.pe/servicios/revestimientos/ on Nov. 18, 2020, published May 5, 2017.

Reply to the Opposition for Chilean Patent Application No. 2019003688, dated Dec. 12, 2020.

International Search Report and Written Opinion for International Application No. PCT/EP2018/066682 dated Sep. 26, 2018.

Office Action and Search Report for corresponding Chinese Application No. 201800409113 dated Aug. 16, 2021.

* cited by examiner

HAUL TRUCK BODY AND A METHOD FOR MANUFACTURING A HAUL TRUCK BODY

CROSS-REFERENCE TO RELATED APPLICATIONS

This application is the U.S. national stage application of International Application PCT/EP2018/066682, filed Jun. 21, 2018, which international application was published on Dec. 27, 2018, as International Publication WO 2018/234514 A1 in the English language. The International Application claims priority of European Patent Application No. 17177442.5 filed Jun. 22, 2017.

TECHNICAL FIELD

The invention relates to a haul truck body and a method for manufacturing a haul truck body. The invention also relates to a truck.

BACKGROUND ART

Wear-resistant linings are known and used both in chutes and on truck platforms for protecting the base. They usually consist of natural or synthetic rubber and are to protect from hard impacts by rocks and wear exerted by material moving over and in contact with the surface of the lining element. Relatively soft rubber materials provide good resistance to wear, but to prevent hard impacts from breaking through the lining element, this must be given a large thickness. Harder rubber materials provide better protection from impacts, but are more susceptible to abrasive wear. Therefore, lining elements have been developed, in which different materials are combined in the outwardly directed surface of the elements, over which surface material in the form of pieces or particles, such as crushed ore and crushed rock material, is intended to move.

A problem when using such lining elements in order to protect a surface from wear, such as a surface on a haul truck body, is that material tends to find its way in under the lining elements by travelling in between an edge of the lining elements and the surface the edge is to bear against. This is a problem since the material gradually will loosen the lining elements from the surface to which it is attached such that the lining elements eventually will fall off. Additionally, the truck will carry around unwanted weight, leading to higher fuel consumption and in turn higher costs than necessary.

To solve the problem mentioned above, the lining elements are normally provided with an integrated steel end protection, which is welded onto the haul truck body. This results in high production costs and a long installation time.

SUMMARY OF THE INVENTION

It is an objective of the present invention to mitigate, alleviate or eliminate one or more of the above-identified deficiencies in the art and disadvantages singly or in any combination and solve at least the above mentioned problems.

According to a first aspect of the invention, these and other objects, and/or advantages that will be apparent from the following description of embodiments, are achieved, in full or at least in part, by a haul truck body comprising a front wall and two opposing side walls. Each side wall presents an inner surface and an upper edge portion extending from a rear end of the side wall towards the front wall. Each side wall comprises an upper reinforcement element which is integrally formed with the side wall and extends along the upper edge portion of the side wall. The reinforcement element presents a lining protection portion projecting inwardly beyond the inner surface of the side wall towards the opposing side wall, and is configured to both reinforce the side wall as well as, by the lining protection portion, to form an upper lining protection for a side wall lining.

The advantages achieved by providing the reinforcement element on the inside of each side wall are comprehensive. As stated above, the reinforcement element will both reinforce the side wall as well as form an upper lining protection for a side wall lining. In turn, the lining elements of the side wall lining will no longer have to be provided with an integrated steel end protection, which will result in lower production costs and also a decreased installation time. The decrease in installation time is achieved by eliminating the step of welding the integrated steel end protection to the haul truck body.

By providing the reinforcement element along the upper edge portion of each side wall it will be able to protect the lining elements all the way up to the top of the side walls.

The haul truck body may further comprise a side wall lining arranged on the inner surface of each side wall, wherein each side wall lining has an upper lining edge which is located directly under the associated lining protection portion.

The lining protection portion as well as the upper lining edge located thereunder may project essentially perpendicular to the surface of the side wall.

Each lining protection portion may project over the upper edge of the side wall lining by a distance at least equal to a thickness of the side wall lining.

Each side wall lining may comprise a plurality side wall lining elements located directly under the associated lining protection portion and forming the upper lining edge of the side wall lining.

The reinforcement element may extend substantially along the entire length of the side wall from the front wall to the rear end.

The reinforcement element may be divided into two or more reinforcement element units.

The front wall may also comprise a reinforcement element which is integrally formed with the front wall and extends along the upper edge portion of the front wall.

According to a second aspect of the invention, these and other objects are achieved, in full or at least in part, by a truck comprising a haul truck body according to the first aspect of the invention.

According to a third aspect of the invention, these and other objects are achieved, in full or at least in part, by a method for manufacturing a haul truck body having a front wall, two opposite side walls, a bottom and a lining. The method comprises forming each side wall with a reinforcement element, which is integrally formed with the side wall and which extends along an upper edge portion of the side wall, such that the reinforcement element presents a lining protection portion projecting inwardly beyond the inner surface of the side wall towards the opposing side wall, and such that the reinforcement element both reinforces the side wall as well as, by the lining protection portion, forms an upper lining protection for a side wall lining, and subsequently attaching a side wall lining on the inner surface of each side wall, the side wall lining having an upper lining edge being located directly under and protected by the lining protection portion.

The step of subsequently attaching a side wall lining on the inner surface of each side wall may comprise attaching a plurality side wall lining elements.

The plurality of side wall lining elements may be attached directly under the associated lining protection portion, thereby forming the upper lining edge of the side wall lining.

The step of forming each side wall with a reinforcement element may comprise forming the reinforcement element to extend substantially along the entire length of the side wall from the front wall to the rear end.

According to a further aspect of the invention, these and other objects, and/or advantages that will be apparent from the following description of embodiments, are achieved, in full or at least in part, by a haul truck body comprising a front wall and two opposing side walls. The front wall presents an inner surface and an upper edge portion extending between the side walls. The front wall comprises an upper reinforcement element which is integrally formed with the front wall and extends along the upper edge portion of the front wall. The reinforcement element presents a lining protection portion projecting inwardly beyond the inner surface of the front wall towards a rear end of the side walls, and is configured to both reinforce the front wall as well as, by the lining protection portion, to form an upper lining protection for a front wall lining.

The haul truck body may further comprise a front wall lining arranged on the inner surface of the front wall, the front wall lining having an upper lining edge which is located directly under the associated lining protection portion.

The lining protection portion as well as the upper lining edge located thereunder may project essentially perpendicular to the inner surface of the front wall.

Each lining protection portion may project over the upper edge of the front wall lining by a distance at least equal to a thickness of the front wall lining.

Each front wall lining may comprise a plurality front wall lining elements located directly under the associated lining protection portion and forming the upper lining edge of the front wall lining.

The reinforcement element may extend substantially along the entire length of the front wall between the side walls.

The reinforcement element may be divided into two or more reinforcement element units.

Effects and features of the second and third aspect of the present invention are largely analogous to those described above in connection with the first aspect of the inventive concept. Embodiments mentioned in relation to the first aspect of the present invention are largely compatible with the further aspects of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

As used herein, the term "comprising" and variations of that term are not intended to exclude other additives, components, integers or steps.

As used herein, the term "integrally formed" and variations of that term are to be interpreted as a component being moulded into one single part or a plurality of parts being attached to each other by for example welding.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figure 1:
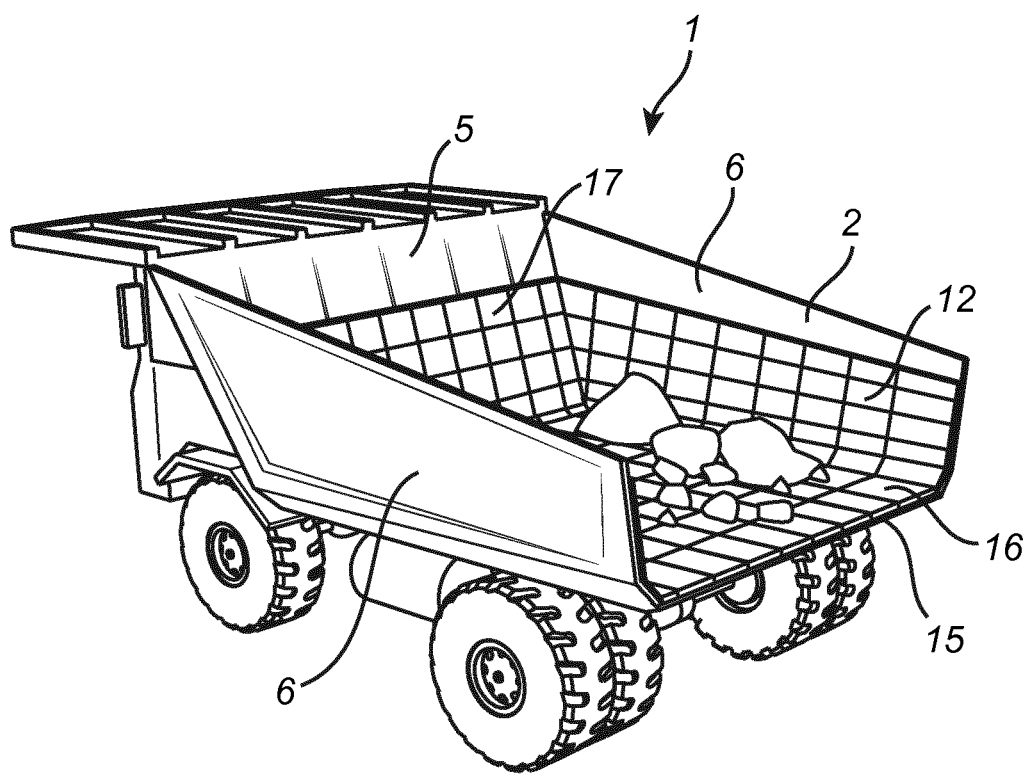
FIG. 1 is a perspective view of a truck comprising a haul truck body according to a first aspect of the invention.

FIG. 1 illustrates one exemplary embodiment of a truck 1 comprising a haul truck body 2 of metal material comprising a lining. The lining is constituted by a plurality of lining elements 3. The lining elements 3 are provided along a surface of the haul truck body 2.

Figure 2:
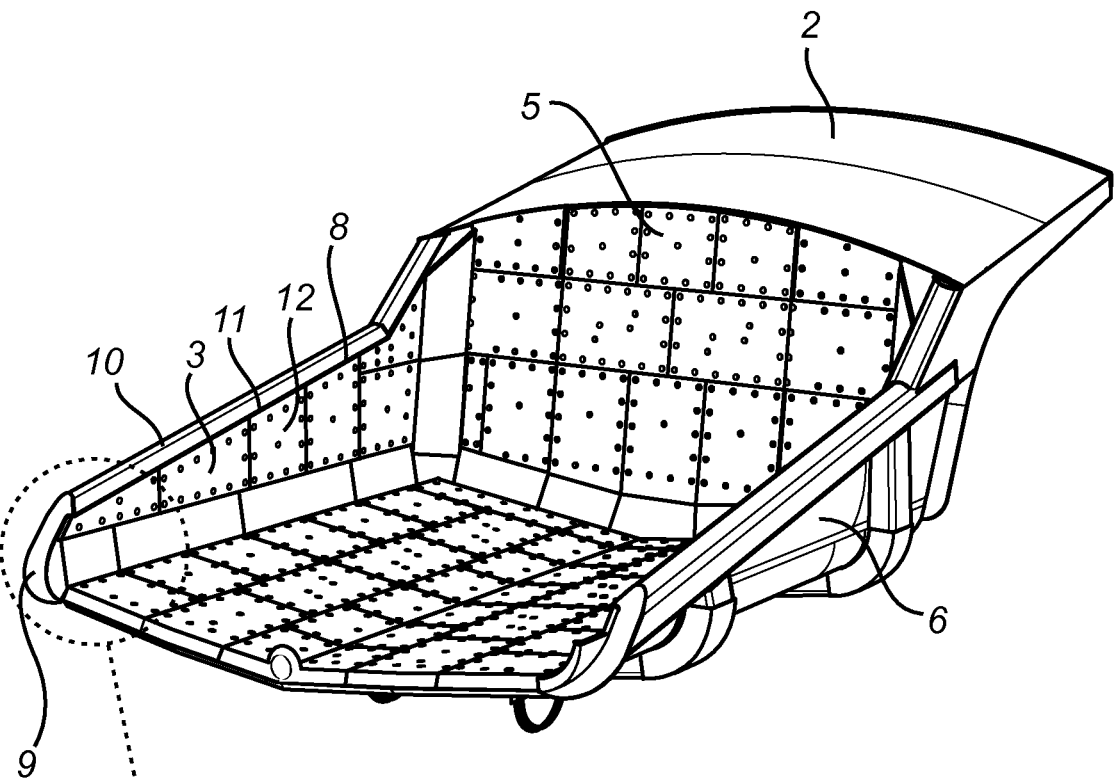
FIG. 2 is a perspective view of an exemplary embodiment of a truck haul body according to the first aspect of the invention.

FIG. 2 illustrates one exemplary embodiment of the haul truck body 2. The haul truck body 2 comprises a front wall 5 and two opposing side walls 6. Each one of the opposing side walls 6 has an inner surface 7 and an upper edge portion 8 which extends from a rear end 9 of the side wall 6 towards the front wall 5. Each one of the side walls 6 further comprises an upper reinforcement element 10 which is integrally formed with the side wall 6 and which extends along the upper edge portion 8 of the side wall 6.

The reinforcement element 10 has a lining protection portion 11 which projects inwardly beyond the inner surface 7 of the side wall 6 towards the opposing side wall 6. The reinforcement element 10 extends substantially along the entire length of the side wall 6 from the front wall 5 to the rear end 9 of the side wall 6.

The haul truck body 2 further comprises a side wall lining 12 which is arranged on the inner surface 7 of each side wall 6. Each side wall lining 12 has an upper lining edge 13 which is located directly under the associated lining protection portion 11. This way, the reinforcement element 10 will both reinforce the side wall 6 and form an upper lining protection for the side wall lining 12.

Figure 2A:
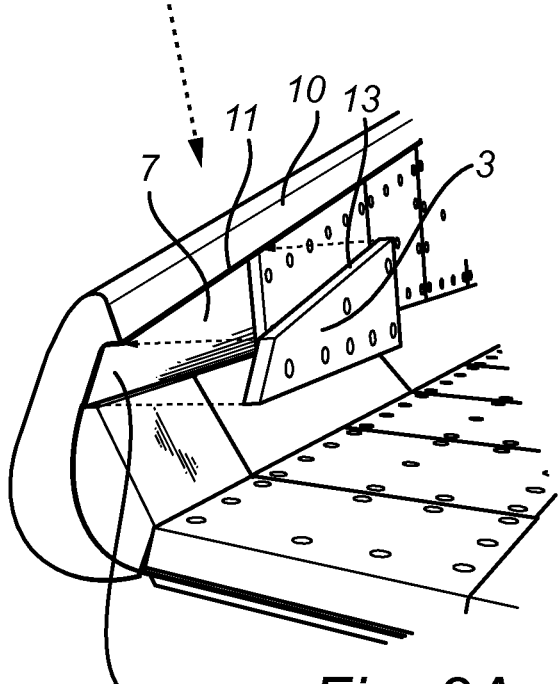
FIG. 2A is an enlargement of a portion of the haul truck body in FIG. 2 upon attachment of a lining element to a side wall thereof.
Figure 2B:
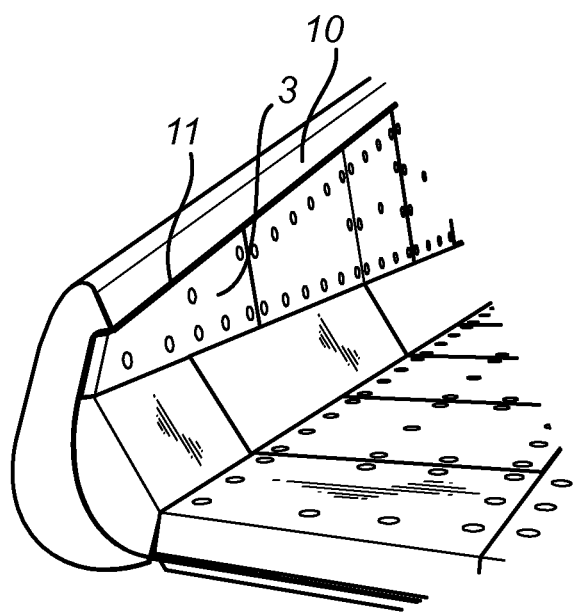
FIG. 2B is an enlargement of the portion in FIG. 2A when the lining element has been attached to the side wall.
Figure 3:
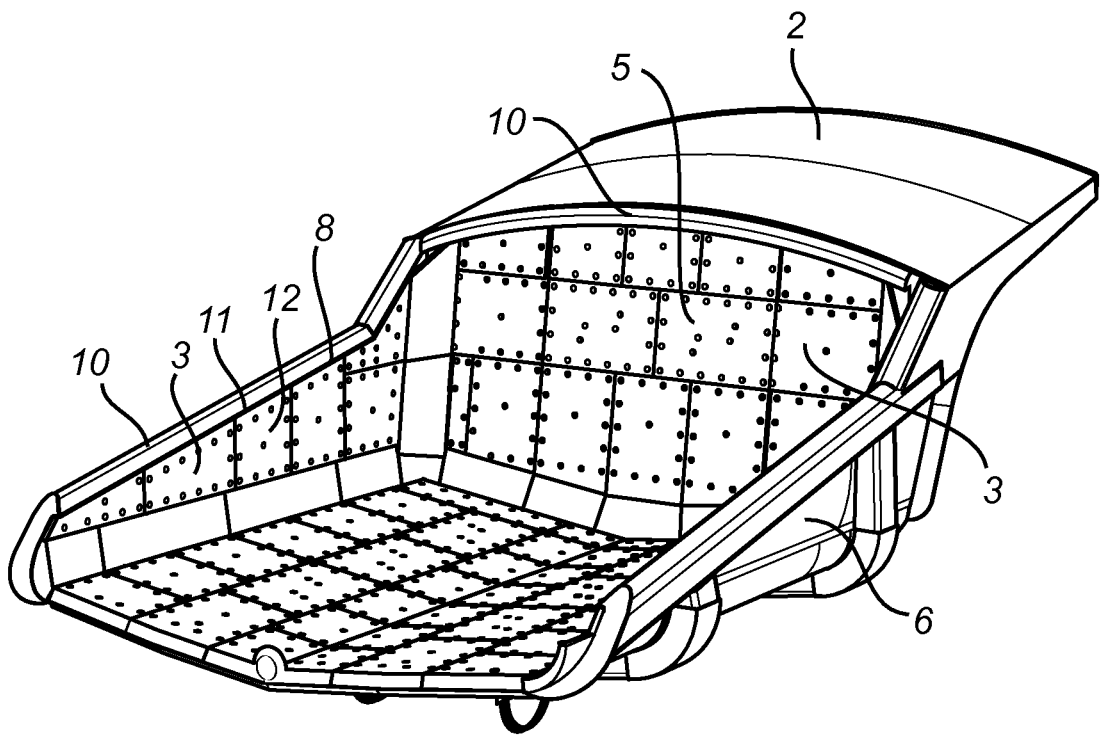
FIG. 3 is a perspective view of a further exemplary embodiment of the truck haul body according to the first aspect of the invention.
Figure 4:
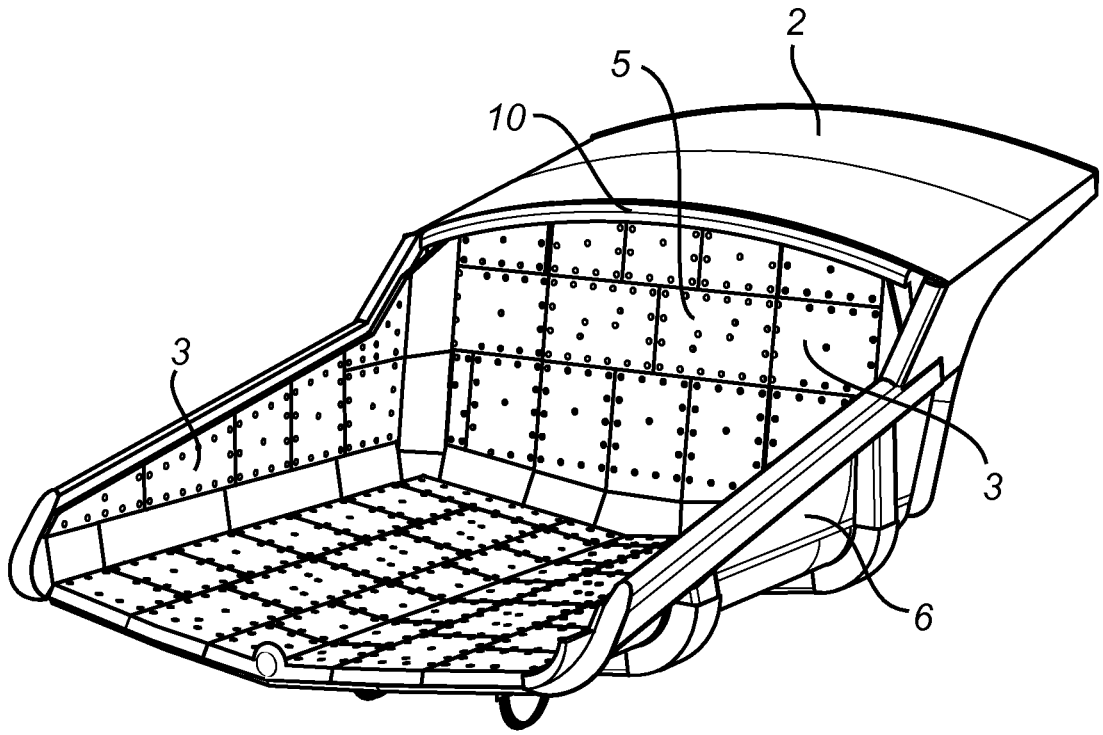
FIG. 4 is a perspective view of an exemplary embodiment of the truck haul body according to a further aspect of the invention.

FIGS. 2A and 2B illustrate an enlargement of a portion of the haul truck body 2. The lining protection portion 11 as well as the upper lining edge 13 located thereunder project essentially perpendicular to the surface of the side wall 6. Each lining protection portion 11 projects over the upper edge portion 8 of the side wall 6 lining by a distance at least equal to a thickness of the side wall lining 12. Each side wall lining 12 comprises a plurality side wall lining elements located directly under the associated lining protection portion 11 thereby forming the upper lining edge 13 of the side wall lining 12.

The lining elements 3 have an outwardly directed surface, over which material in the form of pieces or particles, such as crushed ore and crushed rock material, moves or impacts. The lining elements 3 normally comprise elastomeric material and are preferably made from rubber or polyurethane. Traditionally, the lining elements 3 covering the side walls 6 of the haul truck body have been especially vulnerable since the material impacts on the upper edge thereof. Also, the material tends to find its way in under the lining elements 3 by travelling in between the upper edge of the lining elements 3 and the side wall 6 of the haul truck body 2. This is a problem since the material gradually will loosen the lining elements 3 from the side walls 6 which eventually fall off.

The problems above are solved by means of the reinforcement element 10. The reinforcement 10 element presents a lining protection portion 11 projecting inwardly beyond the inner surface 7 of the side wall 6 towards the opposing side wall 6, thereby creating a roof for the upper edge of the uppermost lining elements 3 on the side wall 6. An effect achieved from this solution is that the lining elements 3 of the side wall lining 12 will no longer have to be provided with an integrated steel end protection for attachment to the side wall 6.

According to a first manufacturing method for the haul truck body 2, the bottom 15, the side walls 6 and the front wall 5 are moulded in one single piece with the reinforcement elements 10, such that each reinforcement element 10 projects inwardly beyond the inner surface 7 of the side wall 6 towards the opposing side wall 6. Thereafter, the haul truck body 2 is provided with a side wall lining 12 on the inner surface 7 of each side wall 6, a bottom lining 16 on the bottom 15 and a front wall lining 17 on the front wall 5.

Another possibility is to separately form the bottom 15, the side walls 6 and the front wall 5. Thereafter, the reinforcement elements 10 are formed and attached to the side walls 6 of the haul truck body 2. As a final step, the haul truck body 2 is provided with a side wall lining 12 on the inner surface 7 of each side wall 6, a bottom lining 16 on the bottom 15 and a front wall lining 17 on the front wall 5 in the same manner as above.

It is understood that other variations in the present invention are contemplated and in some instances, some features of the invention can be employed without a corresponding use of other features. Accordingly, it is appropriate that the appended claims be construed broadly in a manner consistent with the scope of the invention.

For instance, the reinforcement element 10 could be divided into two or more reinforcement element units.

Naturally, the number, size and shape of the components of the haul truck body 2 may be variated in any suitable way without departing from the scope of the invention.

The invention claimed is:

1. A haul truck body, comprising:
a front wall, two opposing side walls, and comprising a side wall lining, each side wall presenting an inner surface and an upper edge portion extending from a rear end of the side wall towards the front wall, wherein each side wall comprises a reinforcement element which is integrally formed with the side wall and extends along the upper edge portion of the side wall, the reinforcement element presenting a lining protection portion projecting inwardly beyond the inner surface of the side wall towards the opposing side wall, the side wall lining comprising a plurality of elastomeric lining elements and being arranged on the inner surface of each side wall, wherein each side wall lining has an upper lining edge which is located directly under the associated lining protection portion, and the reinforcement element being configured to both reinforce the side wall as well as, by the lining protection portion, to form an upper lining protection against impacts for the side wall lining.

2. The haul truck body according to claim 1, wherein the lining protection portion as well as the upper lining edge located thereunder projects essentially perpendicular to the inner surface of the respective side wall.

3. The haul truck body according to claim 1, wherein each lining protection portion projects over the upper edge portion of the side wall lining by a distance at least equal to a thickness of the side wall lining.

4. The haul truck body according to claim 1, the side wall lining elements are located directly under the associated lining protection portion and forming the upper lining edge of the side wall lining.

5. The haul truck body according to claim 1, wherein the reinforcement element extends substantially along the entire length of the respective side wall from the front wall to the rear end.

6. The haul truck body according to claim 1, wherein the reinforcement element is divided into two or more reinforcement element units.

7. The haul truck body according to claim 1, wherein the front wall also comprises a reinforcement element which is integrally formed with the front wall and extends along an upper edge portion of the front wall.

8. A truck, comprising:
the haul truck body according to any one of the preceding claims.

9. A method for manufacturing a haul truck body having a front wall, two opposite side walls, a bottom and a lining, comprising: forming each side wall with a reinforcement element, which is integrally formed with the side wall and which extends along an upper edge portion of the side wall, such that the reinforcement element presents a lining protection portion projecting inwardly beyond an inner surface of the side wall towards the opposite side wall, and such that the reinforcement element both reinforces the side wall as well as, by the lining protection portion, forms an upper lining protection for a side wall lining comprising a plurality side wall lining elements, and subsequently attaching such side wall lining on the inner surface of each side wall, the side wall lining having an upper lining edge being located directly under and protected by the lining protection portion.

10. The method according to claim 9, wherein the plurality of side wall lining elements are attached directly under the associated lining protection portion, thereby forming the upper lining edge of the side wall lining.

11. The method according to claim 9, wherein the step of forming each side wall with a reinforcement element comprises forming the reinforcement element to extend substantially along the entire length of the side wall from the front wall to a rear end.

* * * * *